US011383496B2

(12) United States Patent
Colls et al.

(10) Patent No.: US 11,383,496 B2
(45) Date of Patent: Jul. 12, 2022

(54) FILM FOR BAGGING TACKY MATERIALS

(71) Applicant: Gala Industries, Inc., Eagle Rock, VA (US)

(72) Inventors: Keith Colls, Roanoke, VA (US); Duane Boothe, Clifton Forge, VA (US)

(73) Assignee: Maag Gala, Inc., Eagle Rock, VA (US)

( * ) Notice: Subject to any disclaimer, the term of this patent is extended or adjusted under 35 U.S.C. 154(b) by 400 days.

(21) Appl. No.: 14/939,029

(22) Filed: Nov. 12, 2015

(65) Prior Publication Data

US 2016/0136932 A1  May 19, 2016

Related U.S. Application Data

(60) Provisional application No. 62/079,873, filed on Nov. 14, 2014.

(51) Int. Cl.
| | |
|---|---|
| *B32B 27/06* | (2006.01) |
| *B32B 25/08* | (2006.01) |
| *B32B 27/08* | (2006.01) |
| *B32B 27/18* | (2006.01) |
| *B32B 25/04* | (2006.01) |
| *B32B 27/30* | (2006.01) |

(52) U.S. Cl.
CPC ............ *B32B 27/06* (2013.01); *B32B 25/042* (2013.01); *B32B 25/08* (2013.01); *B32B 27/08* (2013.01); *B32B 27/18* (2013.01); *B32B 27/302* (2013.01); *B32B 2250/42* (2013.01); *B32B 2270/00* (2013.01); *B32B 2307/31* (2013.01); *B32B 2405/00* (2013.01); *B32B 2439/06* (2013.01); *B32B 2439/46* (2013.01)

(58) Field of Classification Search
None
See application file for complete search history.

(56) References Cited

U.S. PATENT DOCUMENTS

| | | | |
|---|---|---|---|
| 4,218,510 A | | 8/1980 | Willson |
| 4,248,348 A | | 2/1981 | Butler et al. |
| 4,335,221 A | | 6/1982 | Gerberding |
| 4,394,473 A | | 7/1983 | Winter et al. |
| 4,785,045 A | | 11/1988 | Yonekura et al. |
| 5,120,787 A | | 6/1992 | Drasner |
| 5,358,783 A | | 10/1994 | Diehl et al. |
| 5,869,555 A | | 2/1999 | Simmons et al. |
| RE36,177 E | * | 4/1999 | Rouyer |
| 5,939,483 A | | 8/1999 | Kueppers |
| 6,541,098 B2 | | 4/2003 | Venkatasanthanam et al. |
| 7,056,971 B2 | | 6/2006 | Varma |
| 8,955,294 B2 | | 2/2015 | Free et al. |
| 2003/0087084 A1 | * | 5/2003 | Mori ............... B32B 27/12 428/318.4 |
| 2006/0205874 A1 | | 9/2006 | Uzee et al. |
| 2006/0234580 A1 | * | 10/2006 | Sustic ............... B32B 27/08 442/149 |
| 2012/0000161 A1 | * | 1/2012 | Free ............... B65B 1/46 53/113 |
| 2013/0309427 A1 | | 11/2013 | Chen et al. |
| 2014/0057411 A1 | | 2/2014 | Hoang et al. |
| 2014/0130458 A1 | | 5/2014 | Booth et al. |
| 2015/0037579 A1 | * | 2/2015 | Juers ............... C09J 123/14 428/355 EN |

FOREIGN PATENT DOCUMENTS

| | | |
|---|---|---|
| CN | 1314433 A | 9/2009 |
| CN | 101175804 B | 6/2013 |
| EP | 0557573 A2 | 9/1993 |
| JP | H05310962 A | 11/1993 |
| JP | 2000502120 A | 2/2000 |
| JP | 2004-27029 A | 1/2004 |
| JP | 2006-512256 A | 4/2006 |
| JP | 2009107729 A | 5/2009 |
| JP | 2015524008 A | 8/2015 |
| KR | 100235818 B1 | 12/1999 |
| KR | 1020040089396 A | 10/2004 |
| TW | 201223984 A | 6/2012 |
| WO | 2013173072 A1 | 11/2013 |

OTHER PUBLICATIONS

Kraton, Kraton D SIS, Dec. 2011, retrieved from https://web.archive.org/web/20111204161154/http://kraton.com/products/KRATON_D_SIS.php , pp. 1-3 (Year: 2011).*
Kraton Corporation, Kraton D1162 P Polymer, 2018, pp. 1-3 (Year: 2018).*
International Search Report from related PCT/US15/60307, dated Jan. 20, 2016, 2 pages.
Written Opinion of the International Searching Authority related PCT/US15/60307, dated Jan. 20, 2016, 7 pages.
Material Data Document, Kraton® D1117P Polymer, Kraton Polymers, Jul. 30, 2007, 1 page.
First Chinese Office Action dated Aug. 24, 2018 from Application No. 201580061227X.
First Taiwanese Office Action dated Aug. 7, 2019, issued from correspondence Application No. 104137343.
First Notification of Reasons for Refusal dated Aug. 30, 2021, from corresponding Japanese application No. JP2020-126176.

* cited by examiner

*Primary Examiner* — Sheeba Ahmed
(74) *Attorney, Agent, or Firm* — John Morrissett; Scott A. Bergeson

(57) ABSTRACT

A bagging film includes two resins blended with a modifying agent. The first resin, making up about 60%-85% of the formulation, is a copolymer, polymer, elastomer, or combination thereof. The second resin, making up about 14%-39% of the formulation, is a different copolymer, polymer, elastomer, or combination thereof that is physically softer than the first resin. The modifying agent, making up about 0.25%-3.5% of the formulation, is compounded with the resin formulation such that the modifying agent creates a lubricant between the successive layers of the film.

23 Claims, No Drawings

FILM FOR BAGGING TACKY MATERIALS

CROSS REFERENCE TO RELATED APPLICATIONS

This application claims the benefit of U.S. Provisional Application No. 62/079,873, titled "FILM FOR BAGGING TACKY MATERIALS," filed Nov. 14, 2014, and which is fully incorporated by reference.

FIELD OF THE INVENTION

The presently disclosed subject matter relates generally to film, particularly a film for bagging tacky materials.

BACKGROUND

Tacky materials, such as hot melt adhesives, pressure sensitive adhesives, and hot melt pressure sensitive adhesives (e.g., asphalt, rubber materials, thermoplastic elastomers, etc.) are generally applied by an applicator machine in a molten or liquid state during applicator processes and can be difficult to store and transport in their form at room temperature. These tacky materials are typically provided as blocks (using expensive and wasteful packaging), pellets, or drums and, due to their tacky nature, tend to stick to each other, adhere to bagging and packaging devices, and/or pick up contaminants during storage and transport. To address these concerns, various bagging devices and methods have been developed, including bagging films that dissolve as part of the tacky materials during melting.

While these dissolvable bagging films may not deleteriously affect the properties of the tacky materials as they are typically less than 5 wt % of the total weight, the films may not readily blend into the molten tacky materials or match the desired properties of the tacky materials. For example, some dissolvable bagging films may not meet a low melt temperature requirement and may not be formulated to prevent self-sticking. Additionally, more basic requirements may not be met by traditional bagging films, such as having a reasonable and consistent film thickness, being heat sealable, being configured to easily slide over the collar of a bagging unit (i.e., having a low enough coefficient of friction), and not becoming a contaminant within the melted tacky material. Furthermore, these known bagging films may not be chemically resistant to prevent oils and other additives within the tacky material formulation from leeching out from inside the bag. Further, even bagging films that have these desired properties tend to harden and form un-molten or non-flowable gels, also known as "jelly-fish," within the melt pot, which clog up tacky material applicator machine filters.

Accordingly, there is a need for improved systems and methods to address the above mentioned deficiencies. Embodiments of the present disclosure are directed to these and other considerations.

SUMMARY

Briefly described, embodiments of the presently disclosed subject matter relate to a bagging film that may include two resins blended with a modifying agent, such as a slip agent, blooming agent, or flow modifier. The first resin, making up about 60-85% of the formulation, may be a copolymer, polymer, elastomer, or combination thereof. The second resin, making up about 14-39% of the formulation, may be a different copolymer, polymer, elastomer, or combination thereof that is physically softer than the first resin. The modifying agent may be compounded with the resin formulation such that it creates a lubricant between the layers.

The first and second resins may comprise thermoplastic polymers including, but not limited to, A-B-A triblock copolymers, A-B diblock copolymers, A-B-A-B-A-B multiblock copolymers, and the like. In one embodiment, A-B-A triblock copolymers may include polystyrene as the A-block and polybutadiene as the B-block. In another embodiment, the A-B-A triblock copolymers may include polystyrene as the A-block and polyisoprene as the B-block. In some embodiments, the styrene/isoprene ratio can range from about 10/90 styrene/isoprene to about 25/75 styrene/isoprene. It is contemplated that A-B-A triblock copolymers based on styrene and ethylene/butylenes may also be used as the first and second resin. In one embodiment, the styrene content may range from about 10% to about 60% styrene. In another embodiment, the styrene content may be about 30% styrene. Additionally, the A-B-A triblock copolymer may comprise styrene and ethylene/propylene. The styrene content may range from 10% to 60% styrene. The resins may comprise polymers such as styrene-isoprene-styrene ("SIS"), styrene-butadiene-styrene, ethylene-butadiene, ethylene-propylene, acrylonitrile-butadiene-styrene, styrene-butadiene, styrene-acrylonitrile, ethyl-vinyl acetate, polyether-polyamide, and the like. It is also contemplated that the resins may comprise syndiotactic 1,2-polybutadiene elastomers. The resins may have a melting point from about 60° C. to about 150° C.

The modifying agent may comprise long-chain fatty acid amides including, but not limited to, stearamide, oleamide, erucamide, beheamide, oleyl palmitamide, stearyl erucamide, ethylene bisstearamide, ethylene bisoleamide, isostearamide, isobehenamide, and derivatives thereof. Shorter chain amines may also be utilized, as well as both saturated and unsaturated acid amides. Glycerol esters, ethoxylated amines, alkanamides and sodium alkyl sulphonates are also contemplated. The modifying agent may comprise an ultra-high molecular weight siloxane polymer dispersed in polypropylene homopolymer. Additionally, the modifying agent may comprise a talc, such as calcium and/or magnesium silicate. In some embodiments, the modifying agent may comprise from about 20% to about 40% talc. For example, in one embodiment, the modifying agent may comprise about 30% talc. The average talc particle size may be less than about 10 microns, less than about 5 microns, less than about 2 microns, or less than about 1 micron. In one embodiment, the 98% of the talc particles may be less than about 10 microns, 80% of the particles may be less than about 5 microns, 25% of the particles may be less than about 2 microns, and 10% of the particles may be less than about 1 micron. It is contemplated that the modifying agent may comprise natural or synthetic silica. In some embodiments, the silica content may range from about 15% to about 25% silica. In other embodiments, the silica content may range from about 40% to about 55% silica. The natural silica content may be about 50% silica or about 30% silica. The synthetic silica may be about 20% silica. The silica modifying agents may further comprise a carrier substance. In one embodiment, the carrier substance may comprise a low-density polyethylene.

In some embodiments, the disclosed bagging film may meet a predetermined low melt temperature requirement and be constructed of a formulation such that the film does not stick to itself. In other embodiments, the bagging film may be of a reasonable and consistent film thickness. Further, the bagging film may be configured to easily slide over a forming collar of a bagging unit. In further embodiments, the bagging film may have a predetermined amount of strength and rigidity such that the resulting bags that are formed and cut from the film do not excessively stretch, thereby avoiding bag filling problems and/or bagging unit jams. In some embodiments, the bagging film may be heat sealed. Further, the bagging film may be configured to not become a contaminant within a melted tacky material. The bagging film may also be chemically resistant to prevent oils and other additives within the tacky material formulation to leech out from inside the bag or to be dissolved by the chemistry of the tacky material.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

DETAILED DESCRIPTION

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, similar components that are developed after development of the presently disclosed subject matter.

To facilitate an understanding of the principles and features of the invention, various illustrative embodiments are explained below. In particular, the presently disclosed subject matter is described in the context of being a bagging film.

In one embodiment, the disclosed bagging film may include two resins blended with a modifying agent. The first resin, making up about 60%-85% of the formulation, may be a copolymer, polymer, elastomer, or combination thereof. It is contemplated that the first resin may comprise about 70%-80% of the formulation in some embodiments, and about 74.01% of the formulation in other embodiments. In further embodiments, the first resin may comprise about 74.26% of the formulation. The second resin, making up about 14%-39% of the formulation, may be a different copolymer, polymer, elastomer, or combination thereof that is physically softer than the first resin. It is contemplated that the second resin may comprise about 19%-30% of the formulation in some embodiments, and about 24.49% of the formulation in other embodiments. In further embodiments, the second resin may comprise about 24.74% of the formulation. The modifying agent may be compounded with the resin formulation such that it creates a lubricant between the layers.

The about 74.01%-24.49% ratio for the resin formulation may provide for a desired balance between the harder first resin and the softer second resin. Increasing the percentage of the first resin may eventually cause problems making the film, such as pulling holes or tears in the film. Increasing the percentage of the second resin may eventually make the film too elastic, suffer excessive film thickness variations, and/or require the film to be thicker overall, making the film more costly. In other embodiments, the about 74.26%-24.74% ratio for the resin formulation may provide for a film that is less expensive to make. The modifying agent, making up about 0.25%-3.5% of the formulation, may be, for example, a slip agent, blooming agent, or flow modifier. It is contemplated that the modifying agent may comprise about 1%-2% of the formulation in some embodiments, and about 1.5% of the formulation in other embodiments. The about 1.5% weight dose of modifying agent may prevent the film from sticking to itself as the film is processed. Specifically, decreasing the modifying agent percentage may increase the risk of the film adhering to itself on the roll to the extent that the film cannot be removed for production. In other embodiments, the modifying agent may comprise about 0.5%-1.5% of the formulation, for example, about 1% of the formulation. The about 1% weight dose of modifying agent may be slightly less effective at preventing the film from adhering to itself than the 1.5% weight dose, while making the film more expensive to manufacture as the modifying agent is typically less expensive than the first and second resins.

The first and second resins may comprise thermoplastic polymers including, but not limited to, A-B-A triblock copolymers, A-B diblock copolymers, A-B-A-B-A-B multiblock copolymers, and the like. In one embodiment, A-B-A triblock copolymers may include polystyrene as the A-block and polybutadiene as the B-block. In another embodiment, the A-B-A triblock copolymers may include polystyrene as the A-block and polyisoprene as the B-block. In some embodiments, the styrene/isoprene ratio can range from about 10/90 styrene/isoprene to about 25/75 styrene/isoprene. It is contemplated that A-B-A triblock copolymers based on styrene and ethylene/butylenes may also be used as the first and second resin. In one embodiment, the styrene content may range from about 10% to about 60% styrene. In another embodiment, the styrene content may be about 30% styrene. Additionally, the A-B-A triblock copolymer may comprise styrene and ethylene/propylene. The styrene content may range from about 10% to about 60% styrene. The resins may comprise polymers such as styrene-isoprene-styrene ("SIS"), styrene-butadiene-styrene, ethylene-butadiene, ethylene-propylene, acrylonitrile-butadiene-styrene, styrene-butadiene, styrene-acrylonitrile, ethyl-vinyl acetate, polyether-polyamide, and the like. It is also contemplated that the resins may comprise syndiotactic 1,2-polybutadiene elastomers. The resins may have a melting point from about 60° C. to about 150° C.

In some exemplary embodiments, the first resin may be a clear SIS linear triblock copolymer based on styrene and isoprene with a polystyrene content of about 43%. The first resin may be typically supplied as a dusted dense pellet and used in that form or in other forms, such as micropellets (pellets having a cross section smaller than about 1.0 mm) or powders. The first resin may have a melt index of about 45 g/10 min. at 200° C., 5 kg, and a specific gravity of about 0.92 g/cc. It is contemplated that other resins with similar properties may be used.

While this SIS provides some of the desired properties of the formulation, it may be too hard by itself, which could cause problems making the film, such as pulling holes or tears in the film. Accordingly, the first resin may be combined with a second, softer resin that may or may not share other desired properties with the first resin.

In some exemplary embodiments, the second resin may be a clear SIS linear triblock copolymer based on styrene and isoprene with a polystyrene content of about 17%. The second resin may be typically supplied as a dusted dense pellet and used in that form or in other forms, such as micropellets or powders. The second resin may have a hardness of about 33 Shore A (10s), a melt index of about 25-35 g/10 min. at 200° C., 5 kg, a styrene/rubber ratio of about 17/83, a tensile strength of about 1200 psi, a 300% modulus of about 60 psi, an elongation at break of about 1300%, a specific gravity of about 0.92 g/cc, and a diblock content of about 33. In some embodiments, the second resin may have a melt index of about 33 g/10 min. at 200° C., 5 kg. It is contemplated that other resins with similar properties may be used.

The second resin may be too soft by itself, which could cause tension issues winding the film onto the core as well as processing issues in the baggers due to excess stretchiness. Combining first and second resins, however, may provide for a desired balance between the harder first resin and the softer second resin.

While the resin formulation may provide many of the desired film properties, it may remain stuck to itself after being rolled onto a core, such as a three inch core. The inventors surprisingly found that a modifying agent may be added to the resin formulation and compounded with the first and second resins to prevent successive layers of the film from self-sticking.

In some embodiments, the modifying agent may include a slip agent, a blooming agent, and/or a flow modifier. The modifying agent may comprise long-chain fatty acid amides including, but not limited to, stearamide, oleamide, erucamide, beheamide, oleyl palmitamide, stearyl erucamide, ethylene bisstearamide, ethylene bisoleamide, isostearamide, isobehenamide, and derivatives thereof. Shorter chain amines may also be utilized, as well as both saturated and unsaturated acid amides. Glycerol esters, ethoxylated amines, alkanamides and sodium alkyl sulphonates are also contemplated. The modifying agent may comprise an ultrahigh molecular weight siloxane polymer dispersed in polypropylene homopolymer. Additionally, the modifying agent may comprise a talc, such as calcium and/or magnesium silicate. In some embodiments, the modifying agent may comprise from about 20% to about 40% talc. For example, in one embodiment, the modifying agent may comprise about 30% talc. The average talc particle size may be less than about 10 microns, less than about 5 microns, less than about 2 microns, or less than about 1 micron. In one embodiment, the 98% of the talc particles may be less than about 10 microns, 80% of the particles may be less than about 5 microns, 25% of the particles may be less than about 2 microns, and 10% of the particles may be less than about 1 micron. It is contemplated that the modifying agent may comprise natural or synthetic silica. In some embodiments, the silica content may range from about 15% to about 25% silica. In other embodiments, the silica content may range from about 40% to about 55% silica. The natural silica content may be about 50% silica or about 30% silica. The synthetic silica may be about 20% silica. The silica modifying agents may further comprise a carrier substance. In one embodiment, the carrier substance may comprise a low-density polyethylene.

In some embodiments, the modifying agent may be supplied as a powder and used in that form or in other forms, such as a liquid, a flake, micropellets, or pellets. For example, the modifying agent may be supplied in a powder form and compounded with the resin formulation. Upon creating a film with the compounded material, the modifying agent may include a blooming agent and bloom from within the film to the outer surface, which creates a lubricant between the layers.

The modifying agent may be primarily used as a surface lubricant in rubber articles and as an antiblock/slip agent in polyolefin films (e.g., LDPE and PP). With rubber, the modifying agent may be used at low loadings (e.g., 1-2 phr in NBR and CR; 3-5 phr in EPDM) from most elastomers, creating a low coefficient of friction on the surface of molded goods. The modifying agent may provide a non-oily, non-greasy lubricating film on exposed rubber surfaces. In some embodiments, the modifying agent's surface lubrication effect may be used to improve a rubber's resistance to sliding abrasion, prevent galling of parts to dry metal surfaces, ease installation of rubber parts by letting them slip into position, and reduce sticking together of cured parts. Additionally, the modifying agent may act as a process aid in all polymers.

In some exemplary embodiments, the modifying agent may have an appearance of free flowing white beads, a melt point of about 100° C., a specific gravity of about 0.85-0.89, an acid value of about 2.5, a Gardner color of about 3, and an iodine value of about 1. It is contemplated that other modifying agents with similar properties may be used.

In some embodiments, the resin formulation may include three or more resins, which may include the first and the second resins. In other embodiments, two or more modifying agents may be used in making the film.

The disclosed bagging film may have a melt flow index of about 35-55 g/10 min. at 200° C., 5 kg in some embodiments, and about 43.5 g/10 min. at 200° C., 5 kg in other embodiments. The film may have a density of about 0.9-1.0 g/ml in some embodiments, and about 0.9588 g/ml in other embodiments. The film may have a coefficient of friction of about 0.51-0.54 PSI (static) and about 0.50-0.53 PSI (dynamic) in some embodiments, and about 0.524 PSI (static) and about 0.512 PSI (dynamic) in other embodiments. The film may have an elmendorf tear transverse direction of about 140-180 g/mil in some embodiments, and about 157 g/mil in other embodiments. The film may have a heat capacity of about 1.65-1.75 J/g at 20° C., about 1.75-1.85 J/g at 93° C., and about 2.05-2.15 J/g at 180° C. in some embodiments, and about 1.7 J/g at 20° C., about 1.8 J/g at 93°, and about 2.1 J/g at 180° C. in other embodiments. The film may have the above-noted properties using ASTM standard methods.

In the tensile testing data machine direction, the disclosed film may have an elastic modulus of about 30,000-50,000 PSI, a stress at yield of about 500-800 PSI, a stress at break of about 3,500-4,500 PSI, and an elongation at break of about 1,000%-1,400% using ASTM standard methods (e.g., ASTM D882-12). For example, in one embodiment, the disclosed film may have an elastic modulus of about 42,200 PSI, a stress at yield of about 656 PSI, a stress at break of about 3,960 PSI, and an elongation at break of about 1,200% using ASTM standard methods.

In the tensile testing data transverse direction, the disclosed film may have an elastic modulus of about 5,000-9,000 PSI, a stress at yield of about 250-450 PSI, a stress at break of about 3,000-4,500 PSI, and an elongation at break of about 1,100%-1,500% using ASTM standard methods (e.g., ASTM D882-12). For example, in one embodiment, the disclosed film may have an elastic modulus of about 7,180 PSI, a stress at yield of about 337 PSI, a stress at break of about 3,750 PSI, and an elongation at break of about 1,300% using ASTM standard methods.

The disclosed bagging film may meet a predetermined low melt temperature requirement and be constructed of a formulation such that the film does not stick to itself. That is, the film may be able to unroll off of itself and then, after forming bags that are filled with tacky materials and the bags are packaged together (e.g., in a box stored in a warm warehouse for a period of time), the bags would not stick to one another. In some embodiments, the bagging film may meet a low melt temperature requirement of about 80° C. to about 176° C. For example, in some embodiments, the bagging film may meet a low melt temperature requirement of about 85° C. to about 106° C. In other embodiments, the bagging film may meet a low melt temperature requirement of about 90° C. to about 95° C. It is contemplated that the bagging film melting temperature may be lower than common melt pot temperatures of about 176° C. and higher.

The disclosed bagging film may be of a reasonable and consistent film thickness. In one embodiment, the film may have a consistent thickness of about 3 mil. It is to be understood that a film having a consistent thickness for purposes of this disclosure may slightly vary in thickness over the width of the film, for example by about +/−0.25 mil. At a thickness of about 3 mil+/−0.25 mil, the disclosed film may slide more easily within a bagging unit. By providing a consistent thickness, the film may avoid feeding problems through the bagging unit. It is contemplated that the film may have other consistent thicknesses, however, such as about 2 mil or less. By having a smaller thickness, the film may have a lower weight percentage and thus a lower effect on the bagged tacky materials. Further, a thinner film may allow for an increased length or number of bags per pound or kilogram of raw materials, thereby reducing the production cost. On the other hand, a film having a smaller thickness may also have a greater risk of tearing as it is being produced. That is, a thinner film may necessitate slower production or face an increased risk of wasted film due to tearing during production, thereby increasing the production cost. Alternatively, the film may vary in thickness as needed for the desired application.

The disclosed bagging film may be configured to easily slide over a forming collar of a bagging unit. That is, based on the film formulation, particularly the modifying agent, and the film thickness, the film may easily slide over the forming collar to form a bag. Specifically, as the film approaches its desired length during production, the film may be sealed and cut to form a bag.

In some embodiments, the disclosed bagging film may have a predetermined amount of strength and rigidity such that the resulting bags that are formed and cut from the film do not excessively stretch, thereby avoiding bag filling problems and/or bagging unit jams.

In other embodiments, the disclosed bagging film may be heat sealed. That is, the bagging film may not be too difficult to quickly melt for sealing, while not being too easy to overheat or to burn-through during sealing. For example, the film may be heat sealed as described in U.S. patent application Ser. No. 13/202,909. In some embodiments, this feature may be achieved by setting the film thickness at a desired level. When the film is too thick, it may require more time for heating and/or more heat to melt and seal. When the film is too thin, it may burn through, thereby damaging the film. The bagger used to form bags out of the film may include an adjustable heat sealer, which allows for adjusting the dwell time and temperature to a desired level relative to the film thickness.

In some embodiments, the disclosed bagging film may be configured to not become a contaminant within a tacky material (e.g., a melted adhesive). For example, the film may comprise materials that are the same, similar, or compatible with the tacky material. That is, the tacky material may be made from the same or similar materials to the bagging film. Further, the weight percentage of the film compared to the tacky material may be small enough to render it insignificant as a contaminant. Being configured to not become a contaminant within the melted tacky material may prevent the bagging film from deleteriously affecting the tacky material.

The bagging film may also be chemically resistant to prevent oils and other additives within the tacky material formulation to leech out from inside the bag or to be dissolved by the chemistry of the tacky material.

The disclosed bagging film may be produced by one or more disclosed methods. In some embodiments, the first and second resins may be blended together in a desired ratio, such as an about 74.01%-24.49% ratio or an about 74.26%-24.74% ratio. For example, as a preblending step, pellets of the first and second resins may be mixed together before being sent to an extruder. It is contemplated that either or both of the resins may be blended with the modifying agent prior to preblending. Alternatively, in some embodiments, the resins may be blended before adding the modifying agent to the resin formulation. For example, the modifying agent may be mixed into the resin formulation in the extruder following preblending. Regardless of when it is introduced, the modifying agent may be added to the resin formulation at a desired weight percentage dose, such as an about 1.5% weight dose or an about 1% weight dose. The modifying agent may compound with the resin formulation such that the modifying agent creates a lubricant between successive layers of the film formulation.

After being formulated and worked into a film, the resulting film may be formed into a bag. For example, the film may be formed into a bag as described in U.S. patent application Ser. No. 13/202,909 and in U.S. patent application Ser. No. 14/094,519. The resulting film bag may be used to house tacky materials (e.g., house adhesives) while providing the disclosed advantages. Another unique advantage of the disclosed bagging film is that, due to its formulation, the film may avoid hardening or "crosslinking" and forming unmolten or non-flowable gels, or so-called "jelly-fish," within the melt pot, which may clog the tacky material applicator machine filters. That is, the resins used in the film may allow for minimal crosslinking compared to other materials. For example, SIS may have more tack than other materials, and be less likely to gel upon heating due to different degradation mechanisms.

It is contemplated that the disclosed bagging films may be used to bag other materials, such as rubber, asphalt, wax, thermoplastic elastomers, and tacky materials, including materials that are tacky based on temperature. As described, the first resin, second resin, and modifying agent may be selected based on the desired film qualities, which may reflect the bagged materials.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A roll of film for forming one or more bags, the film having a formulation comprising:
   a first resin present in an amount of about 74.01 percent by weight of the formulation;
   a second resin present in an amount of about 24.49 percent by weight of the formulation, the second resin being physically softer than the first resin; and
   a modifying agent present in an amount of about 1.5 percent by weight of the formulation, wherein the modifying agent comprises a blooming agent configured to act as a lubricant to prevent self-adhesion; and
   wherein the film is rolled onto a core.

2. A bag comprising a film, the film having a formulation comprising:
   a first resin present in an amount of from about 70 to about 80 percent by weight of the formulation;
   a second resin present in an amount of from about 19 to about 30 percent by weight of the formulation, the second resin being physically softer than the first resin; and
   a modifying agent, wherein the modifying agent comprises a blooming agent configured to act as a lubricant to prevent self-adhesion,
   wherein the first and/or second resin comprises about 10 to about 60 percent by weight styrene, and
   wherein the bag is housing tacky materials.

3. The bag of claim 2, wherein the first resin comprises one or more of a copolymer, a polymer, and an elastomer.

4. The bag of claim 2, wherein the second resin comprises one or more of a copolymer, a polymer, and an elastomer.

5. The bag of claim 2, wherein the first and second resins comprise different copolymer(s), polymer(s), and/or elastomer(s).

6. The bag of claim 2, wherein the modifying agent is present in an amount of from about 0.25 to about 3.5 percent weight of the formulation.

7. The bag of claim 6, wherein the modifying agent is present in an amount of from about 1.0 to about 2.0 percent weight of the formulation.

8. The bag of claim 7, wherein the modifying agent is present in an amount of about 1.5 percent weight of the formulation.

9. The bag of claim 2, wherein the first and/or second resin comprises about 30 percent by weight styrene.

10. The bag of claim 2, wherein the modifying agent is compounded with the first and second resins.

11. The bag of claim 2, wherein one or more of the first and second resins has a melting point between about 60° C. to about 150° C.

12. The bag of claim 2, wherein the first resin comprises a styrene-isoprene-styrene linear triblock copolymer with a styrene content of about 43 percent by weight.

13. The bag of claim 2, wherein the first resin has a melt index of about 45 g/10 min. at 200° C., 5 kg, and a specific gravity of about 0.92 g/cc.

14. The bag of claim 2, wherein the second resin comprises a styrene-isoprene-styrene triblock copolymer with a styrene content of about 17 percent by weight.

15. The bag of claim 2, wherein the second resin has a hardness of about 33 Shore A (10s), a melt index of about 33 g/10 min. at 200° C., 5 kg, a styrene/rubber ratio of about 17/83, a tensile strength of about 1200 psi, an about 300 percent modulus of about 60 psi, an elongation at break of about 1300 percent, a specific gravity of about 0.92 g/cc, and a diblock content of about 33.

16. The bag of claim 2, wherein the modifying agent further comprises a slip agent, a flow modifier, or combinations thereof.

17. The bag of claim 2, wherein the modifying agent comprises a long-chain fatty acid amide.

18. The bag of claim 17, wherein the long-chain fatty acid amide comprises a saturated stearamide.

19. The bag of claim 2, wherein the film melts at a temperature of between about 80° C. to about 176° C.

20. The bag of claim 19, wherein the film melts at a temperature of between about 85° C. to about 106° C.

21. The bag of claim 20, wherein the film melts at a temperature of between about 90° C. to about 95° C.

22. A bag comprising a film, the film having a formulation comprising:
   a first resin comprising a styrene-isoprene-styrene triblock copolymer with a styrene content of about 43 percent by weight, the first resin present in an amount of about 74.01 percent by weight of the formulation;
   a second resin comprising a styrene-isoprene-styrene triblock copolymer with a styrene content of about 17 percent by weight, the second resin present in an amount of about 24.49 percent by weight of the formulation, the second resin being physically soft than the first resin; and
   a modifying agent present in an amount of about 1.5 percent by weight of the formulation, wherein the modifying agent comprises a blooming agent configured to act as a lubricant to prevent self-adhesion.

23. A bag comprising a film, the film having a formulation comprising:
- a first resin comprising a first styrene-isoprene-styrene triblock copolymer, the first resin present in an amount of from about 70 to about 85 percent by weight of the formulation;
- a second resin comprising a second styrene-isoprene-styrene triblock copolymer, the second resin present in an amount of from about 14 to about 30 percent by weight of the formulation, the second resin being physically softer than the first resin; and
- a modifying agent, wherein the modifying agent comprises a blooming agent configured to act as a lubricant to prevent self-adhesion.

* * * * *